United States Patent [19]

Stewart

[11] 4,236,199
[45] Nov. 25, 1980

[54] REGULATED HIGH VOLTAGE POWER SUPPLY

[75] Inventor: Roger G. Stewart, Neshanic Station, N.J.

[73] Assignee: RCA Corporation, New York, N.Y.

[21] Appl. No.: 964,388

[22] Filed: Nov. 28, 1978

[51] Int. Cl.³ .................. H02M 3/18; H03B 5/02
[52] U.S. Cl. .................. 363/60; 331/108 C; 331/57
[58] Field of Search ............... 363/59–61, 363/18; 331/108 A, 108 B, 108 C, 108 D, 57, 135, 177 R

[56] References Cited

U.S. PATENT DOCUMENTS

| | | | |
|---|---|---|---|
| 3,671,881 | 6/1972 | Yorganjian | 331/57 |
| 3,742,371 | 6/1973 | Seibt et al. | 363/18 |
| 4,072,910 | 2/1978 | Dingwall et al. | 331/57 |
| 4,083,020 | 4/1978 | Goldberg | 331/108 C X |
| 4,105,950 | 8/1978 | Dingwall | 331/177 R X |

OTHER PUBLICATIONS

John F. Dickson, "On-Chip High-Voltage Generation in MNOS Integrated Circuits Using An Improved Voltage Multiplier Technique," IEEE Journal of Solid State Circuits, vol. SC11, No. 3, Jun. 1976, pp. 374–378.

*Primary Examiner*—Harry E. Moose, Jr.
*Assistant Examiner*—Peter S. Wong
*Attorney, Agent, or Firm*—H. Christoffersen; Henry I. Schanzer

[57] ABSTRACT

In a voltage supply wherein a voltage multiplier produces an output voltage level in proportion to its driving frequency, the output voltage level is regulated by incorporating a voltage controlled oscillator to vary the driving frequency in accordance with the output voltage level of the voltage multiplier. To improve operating efficiency, current amplifiers are disposed between the output of the voltage control oscillator and the input of the voltage multiplier. Furthermore, a level shift means is incorporated in another embodiment for disabling the voltage controlled oscillator and for impressing a rail voltage level at the output terminal of the voltage multiplier.

14 Claims, 2 Drawing Figures

REGULATED HIGH VOLTAGE POWER SUPPLY

The present invention relates to a voltage supply of the type having a frequency responsive voltage multiplier incorporated therein.

Voltage supplies of this type are used where a D.C. output voltage must be produced at a higher level than an input rail voltage. Such voltage supplies are found where increased drive voltage is necessary for LCD's, the write voltage of EAROM's or static RAM's, and to increase operating speed in CMOS logic or microprocessor circuitry. Operating efficiencies for such voltage supplies in the prior art are relatively high only in a narrow range of loading. Furthermore, the output voltage from such prior art supplies is poorly regulated and is highly sensitive to variations in either output loading or input rail voltage.

The voltage supply of the invention operates to substantially overcome the disadvantages encountered in the prior art. Regulation is accomplished by incorporating a voltage controlled oscillator in a feedback loop between the input and output of the voltage multiplier to vary the driving frequency thereof in accordance with the output voltage level. Improved efficiency is accomplished by including current amplification in a buffer means which matches the input characteristics of the voltage multiplier with the output characteristics of the voltage controlled oscillator. A level shift network is incorporated in a particular embodiment to inactivate the voltage multiplier while supplying its rail voltage as the output.

Figure 1:
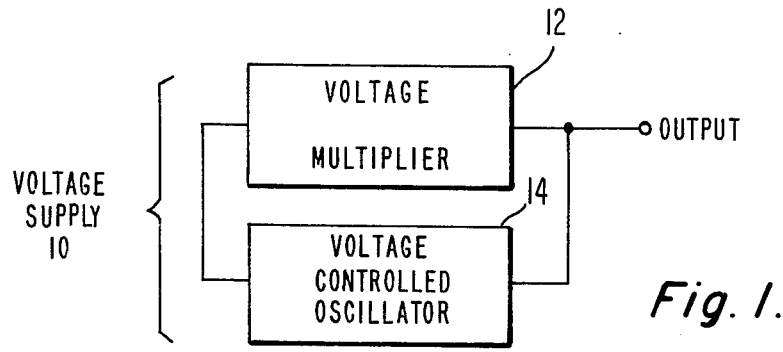
FIG. 1 is a block diagram for the voltage supply of the invention.

As shown in the block diagram of FIG. 1, the voltage supply 10 of this invention includes a voltage multiplier 12 of the type that is driven at a frequency to produce an output voltage level in proportion to the frequency. A voltage controlled oscillator (VCO) 14 is disposed in a feedback loop around the voltage multiplier 12 to vary the driving frequency thereof in accordance with the output voltage level. Because the input to the voltage multiplier 12 is driven from its own output through the VCO 14, the output level of the voltage supply 10 reaches a stabilized or regulated value which is relatively independent of the load, the frequency response characteristic of the voltage multiplier 12, and the voltage response characteristic of the VCO 14. Furthermore, power is conserved in that the VCO 14 only oscillates at sufficiently high frequencies to maintain the output voltage level for the load being applied.

Figure 2:
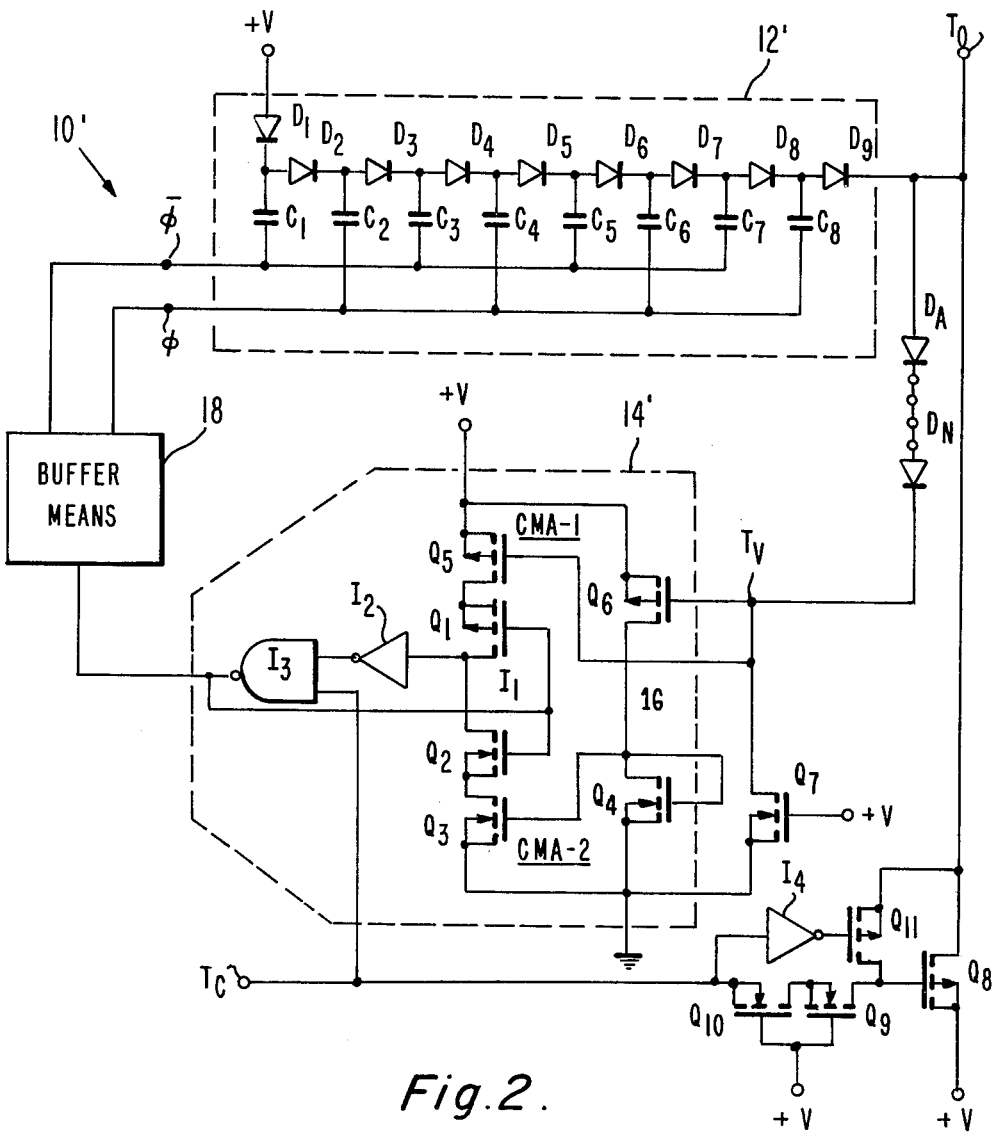
FIG. 2 is a schematic diagram wherein the FIG. 1 elements are combined with other circuitry in one preferred embodiment of the invention.

Although many embodiments of the invention are possible, circuitry for one preferred embodiment is illustrated in FIG. 2 where the voltage multiplier 12' and the VCO 14' are shown. The voltage multiplier 12' includes diodes $D_1$, $D_2$, $D_3$, $D_4$, $D_5$, $D_6$, $D_7$, $D_8$, and $D_9$ arranged in a ladder network with capacitors $C_1$, $C_2$, $C_3$, $C_4$, $C_5$, $C_6$, $C_7$ and $C_8$. $D_1$–$D_9$ are connected in series between a rail level $+V$ and an output terminal $T_o$, while $C_1$–$C_8$ are separately connected between the interconnecting nodes of $D_1$–$D_9$ respectively and a pair of complementary clock input terminals $\phi$ and $\bar{\phi}$ alternately. This ladder network operates to boost the voltage at terminal $T_o$ in a similar manner to the well known Cockcroft-Walton voltage multiplier, as is explained in an article entitled, On-Chip High-Voltage Generation in MNOS Integrated Circuits Using an Improved Voltage Multiplier Technique, which was published in the IEEE Journal of Solid-State Circuits, Vol. SC-11, No. 3, June 1976. Therefore, current is pumped along the diode chain $D_1$–$D_9$ as the coupling capacitors $C_1$, $C_3$, $C_5$ and $C_7$ are charged and discharged during alternate half cycles of the clock signal, while coupling capacitors $C_2$, $C_4$, $C_6$ and $C_8$ are discharged and charged during the same half cycles. Of course, the voltage at each node in the diode chain increases progressively up to the output voltage level at $T_o$. Although the ladder network of the voltage multiplier 12' was selected for the FIG. 2 embodiment of the invention, those skilled in the art will realize without further explanation that other frequency responsive voltage multiplying networks could be utilized in other embodiments of the invention. Furthermore, a capacitor (not shown) could be connected between ground and the output of the voltage multiplier 12' where a reduction in ripple is desired.

The VCO 14' includes an odd numbered plurality of inverter stages connected in a continuous loop or ring such as $I_1$, $I_2$, and $I_3$. A means 16 is also included for controlling the current to one or more of the inverter stages in accordance with the voltage level applied at a terminal $T_V$. Because an odd number of inverter stages are connected in the continuous loop, VCO 14' produces an oscillatory signal at the output of each inverter stage $I_1$, $I_2$ and $I_3$. The frequency of these oscillatory signals depends on the combined functional characteristics of the inverter stages, especially their input capacitance which must be charged and discharged during each frequency cycle. Once the circuitry of the inverter stages $I_1$, $I_2$ and $I_3$ has been chosen, however, their functional characteristics are fixed and the frequency of the VCO 14' is then determined by the current control means 16 as is explained in U.S. Pat. No. 4,072,910.

Although many different circuits could be utilized for the current control means 16 and each of the inverter stages $I_1$, $I_2$, and $I_3$, the embodiment of FIG. 2 is directed to a particular voltage supply application wherein a command signal at a terminal $T_C$ selectively determines which of two positive output levels is supplied. This embodiment is particularly appropriate for supplying the bi-level voltages of one polarity that are required during the read and write periods in some memory storage applications. The command signal at terminal $T_C$ is applied to one input of a NAND gate which is disposed as inverter stage $I_3$. The output of the VCO 14' is taken from the output of the NAND gate which is also connected to each gate electrode in a pair of complementary MOS transistors $Q_1$ and $Q_2$ that are disposed in a known CMOS arrangement as inverter stage $I_1$. The drain-source channels of $Q_1$ and $Q_2$ are series connected with the output from inverter stage $I_1$ being taken from between these drain-source channels and connected to the input of inverter stage $I_2$. The other input of the NAND gate is connected to the output of inverter stage $I_2$ which may be of any known circuit arrangement, such as the CMOS arrangement of converter stage $I_1$. The NAND gate of inverter stage $I_3$ only inverts the output of inverter stage $I_2$ when the command signal at terminal $T_C$ is positive. Therefore, without the positive level command signal no oscillatory signals are developed in the continuous loop of the VCO 14' which is then shut down with a D.C. level appearing at its output.

The current control means 16 includes MOS transistors $Q_3$ and $Q_4$ of the same conductivity type as $Q_2$ and MOS transistors $Q_5$ and $Q_6$ of the same conductivity type as $Q_1$. $Q_3$ and $Q_5$ function to supply current to the inverter stage $I_1$ from the low and high voltage rails respectively. The magnitude of this current supply is controlled through $Q_4$ and $Q_6$ which are combined with $Q_3$ and $Q_5$ respectively as conventional current mirror amplifiers CMA-1 and CMA-2. The voltage level at terminal $T_V$ is connected at the input of CMA-1 and therefore controls the current supplied from the high voltage rail through $Q_5$. Furthermore, the drain-source channel of $Q_6$ in CMA-1 is series connected to the drain-source channel of $Q_4$ so that the same magnitude of current flows through these channels. Consequently, the voltage level at terminal $T_V$ also controls the current supplied from the low voltage rail through $Q_3$ and this current must be equal in magnitude to that supplied from the high voltage rail. Of course, the polarity of the output from inverter $I_3$ controls whether inverter $I_1$ conducts current from either the high or low voltage rail and the CMA's -1 and 2 are structured to control the magnitude of this current in inverse proportion to the voltage level at terminal $T_V$. This is so because the gate to source voltage of $Q_5$ and $Q_6$ increases or decreases as the voltage level at the terminal $T_V$ is decreased or increased respectively, above the conductive threshold level of $Q_5$ and $Q_6$. Since the frequency of VCO 14' varies in proportion to the current supplied to the inverter stage $I_1$ as previously mentioned, that frequency will also increase or decrease as the voltage level of terminal $T_V$ is decreased or increased respectively, above the conductive threshold level of $Q_5$ and $Q_6$. Furthermore, the frequency control range of the VCO 14' is very broad and its frequency can be either increased or decreased monotonically throughout this control range.

Although the voltage multiplier 12 could be driven directly by the VCO 14 in many embodiments of the invention as shown in FIG. 1, a buffer means 18 is included in the FIG. 2 embodiment for matching the input characteristics of the ladder network in the voltage multiplier 12' with the output characteristic of the VCO 14'. Because the output of the VCO 14' is taken from the NAND gate, at least one inverter (not shown) is included in the buffer means 18 to provide the 180° phase relationship between the drive signals at the terminals $\phi$ and $\bar{\phi}$. Also, since the output level of the voltage supply 10' is boosted within the voltage multiplier 12' by charging $C_1$ through $C_8$ with current applied at terminals $\phi$ and $\bar{\phi}$, the load driven by the voltage supply 10' may necessitate that current amplification be provided within the buffer means 18. The output from the NAND gate may be connected through an odd and even number of inverting amplifiers respectively to the terminals $\phi$ and $\bar{\phi}$ in providing a means for such current amplification. Furthermore, adequate design consideration must be given to matching the characteristics of the paths taken between terminals $\phi$ and $\bar{\phi}$ within the buffer means 18, so that the rise time on one terminal and the fall time on the other terminal are essentially complementary. If complementary rise and fall times are not achieved, the oscillatory signal driving terminals $\phi$ and $\bar{\phi}$ will be skewed to cause the charging of $C_1$, $C_3$, $C_5$ and $C_7$ to be out of phase with the discharging of $C_2$, $C_4$, $C_6$ and $C_8$ and vice versa. Where current amplification is provided within the buffer means 18 as discussed above, CMOS inverters may be utilized to resolve this skew problem by fixing the ratios of the P channel widths to the N channel widths in the CMOS inverters to match the characteristics of the paths taken to terminals $\phi$ and $\bar{\phi}$.

Depending on the magnitude of the high voltage rail, a means may be necessary for offsetting the voltage level at the input terminal $T_V$ of the VCO 14' relative to the voltage level at the output terminal $T_O$ of the voltage multiplier 12' to determine the regulated level of that output at terminal $T_O$. To accomplish such regulation in the FIG. 2 circuitry, the gate-source voltage of $Q_5$ and $Q_6$ must be increased from its conductive threshold level in proportion with decreases in the output voltage level. Although those skilled in the art will recognize without further explanation that this offset may be accomplished in several different ways, in the FIG. 2 embodiment of the invention it is accomplished by series connecting a number of diodes $D_A$ through $D_N$ to drop the voltage level between terminals $T_O$ and $T_V$. The drain source channel of a MOS transistor $Q_7$ is also connected between terminal $T_V$ and the low voltage rail while the high voltage rail is applied to the gate electrode of $Q_7$ which then functions as a current sink.

In the memory read/write application of the FIG. 2 embodiment, the high voltage rail must be supplied at terminal $T_O$ of the voltage multiplier 12' when the low level of the command signal is applied to terminal $T_C$. This is accomplished with a level shifting means for disabling the VCO 14' and for impressing the high rail voltage at terminal $T_O$ in response to the command signal. The high voltage rail is applied to terminal $T_O$ through the drain-source channel of a MOS transistor $Q_8$. The gate electrode of $Q_8$ is connected to terminal $T_C$ through the series connected drain-source channels of transistors $Q_9$ and $Q_{10}$ of complementary conductivity type to $Q_8$ and also connected to terminal $T_O$ through the drain-source channel of a MOS transistor $Q_{11}$ of the same conductivity type as $Q_8$. The gate electrodes of $Q_9$ and $Q_{10}$ are commonly connected and the high voltage rail is applied thereto, while the gate electrode of $Q_{11}$ is connected to terminal $T_C$ through an inverter $I_4$. The VCO 14' is disabled through its NAND gate when the level shifting means is incorporated.

As was discussed previously, the VCO 14' is disabled when the low level of the command signal is applied to the one input of the NAND gate. This results in the shutting down of the voltage multiplier 12' because the VCO 14' then produces a D.C. output. However, $Q_9$ and $Q_{10}$ become conductive when the low level of the command signal is applied to terminal $T_C$ which renders $Q_8$ conductive and applies the high voltage rail at terminal $T_O$. This low level command signal renders $Q_{11}$ non-conductive through the inverter $I_4$. However, when the high level of the command signal is applied to terminal $T_C$, $Q_{11}$ is rendered conductive to apply the output from the voltage multiplier 12' at the gate electrode of $Q_8$ which then becomes non-conductive to isolate the high voltage rail from the terminal $T_O$. $Q_9$ and $Q_{10}$ also become non-conductive to isolate the gate electrode of $Q_8$ from terminal $T_C$ when the high level command signal is applied.

Although this invention has been disclosed herein by describing only the preferred embodiments thereof, it should be understood by those skilled in the art that numerous changes in the details of construction and the combination or arrangement of parts could be made in the described embodiments without departing from the true scope and spirit of the invention. Therefore, the present disclosure should be construed as illustrative rather than limiting.

What I claim is:

1. A voltage supply comprising:
 a voltage multiplier (VM) having an input and an output, and of the type which produces at its output a voltage whose level is proportional to the frequency and amplitude of the signal applied at its input;
 a voltage controlled oscillator (VCO) having an oscillation control input and a signal output; and
 direct coupling means connecting the VCO between the output and the input of the voltage multiplier for providing feedback across the voltage multiplier over a range of frequencies extending down to zero frequency including means direct current connecting the output of the voltage multiplier to the oscillation control input of the VCO, and means direct current connecting the signal output of the VCO to the input of the voltage multiplier for varying the frequency of the signals applied to the input of the voltage multiplier in accordance with the voltage level at the output of the voltage multiplier 2. The voltage supply as claimed in claim 1 wherein said means coupling the output of the VCO to the input of the voltage multiplier includes buffer means amplifying the signals produced at the output of the VCO and causing all signals to swing between two relatively fixed voltage levels, for supplying relatively constant amplitude signals of varying frequency to the input of the voltage multiplier.

3. The voltage supply as claimed in claim 2 wherein said buffer means coupling the output of the voltage controlled oscillator to the input of the voltage multiplier includes means for amplifying the current level.

4. The voltage supply as claimed in claim 1 wherein said voltage multiplier is comprised solely of capacitive elements and unidirectional conducting means.

5. The voltage supply as claimed in claim 1 wherein said VCO has a wide range frequency response extending down to zero frequency.

6. The voltage supply as claimed in claim 1 wherein said means direct current connecting the output of the voltage amplifier to the oscillation control input of the VCO includes voltage offsetting means.

7. The voltage supply as claimed in claim 6 wherein said voltage offsetting means includes diodes disposed in series between the voltage multiplier output and the oscillation control input of the VCO.

8. The voltage supply as claimed in claim 1 further including means for selectively disabling said voltage controlled oscillator and for concurrently impressing a rail voltage level at the output of the voltage multiplier in response to a command signal.

9. The voltage supply as claimed in claim 8 wherein said means for impressing a rail voltage at the output of the voltage multiplier includes:
 first and second insulated-gate field-effect transistors (IGFETs), each IGFET having a conduction path and a control electrode;
 means connecting the conduction path of said first IGFET between said voltage multiplier output and said rail voltage; means connecting the conduction path of said second IGFET between said voltage multiplier output and the control electrode of said first IGFET; and means responsive to said command signal connected to the control electrodes of said first and second IGFETs for turning on said first IGFET and turning off said second IGFET in response to a command signal disabling said VCO, and for turning off said first IGFET and turning on said second IGFET in response to the absence of a disabling command signal.

10. The voltage supply as claimed in claim 9 wherein said means responsive to said command signal includes third and fourth IGFETs having their conduction paths connected in series between the control electrode of said first IGFET and a terminal to which is applied said command signal; and
 wherein said first and second IGFETs are of one conductivity type and said third and fourth IGFETs are of opposite conductivity type.

11. The voltage supply as claimed in claim 1 wherein said voltage controlled oscillator includes an odd-numbered plurality of inverter stages connected in a continuous loop and means for controlling the current to one or more of said inverter stages in inverse proportion with the voltage level at the output of the voltage multiplier to thereby control the frequency of said oscillator.

12. The voltage supply as claimed in claim 11 wherein each one of said inverter stages has an output and includes two IGFETs of complementary conductivity type having their conduction paths connected in series and their control electrodes connected in common; and
 wherein said means for controlling the current to an inverter stage includes two additional IGFETs of complementary conductivity type; wherein the conduction path of one of the two current controlling IGFETs is connected in series with the conduction path of the like conductivity inverter stage IGFET between a first voltage rail and the inverter stage output, and wherein the conduction path of the other one of the two current controlling IGFETs is connected in series with the conduction path of the like conductivity inverter stage IGFET between a second voltage rail and the inverter stage output; and
 wherein said means coupling the output of the voltage multiplier to the oscillation control input of the VCO includes means coupling the voltage multiplier output to the control electrodes of the two current controlling IGFETs for controlling the magnitude of the current through their conduction paths and through the conduction paths of their associated inverter stage IGFETs in an inversely proportional relationship to the voltage level at the output of the voltage multiplier.

13. The voltage supply as claimed in claim 1 wherein said VCO includes three stages, each stage having an output; wherein the first stage includes first and second transistors of one conductivity type having their conduction paths connected in series between a first point of operating potential and the output of the first stage, and third and fourth transistors of opposite conductivity type having their conduction paths connected in series between the output of the first stage and a second point of operating potential;
 means connecting the control electrodes of the first and third transistors of the first stage to said oscillator control input of the VCO; and means connecting the control electrodes of the second and fourth transistors of the first stage to the output of the third stage;

wherein the second stage is an inverting stage having an input connected to the output of the first stage; and wherein the third stage is a two input NAND gate; one input of the NAND gate being connected to the output of said second stage; and the other input of said NAND gate being connected to a command signal for selectively disabling said VCO.

14. The voltage supply as claimed in claim 13 wherein said means connecting the control electrodes of the first and third transistors of the first stage to said oscillation control input includes:

means responsive to the voltage multiplier output to concurrently increase current conduction through said first and third transistors of said first stage as the output of the voltage multiplier decreases from its ultimate value thereby increasing the flow of current through said first stage and the frequency of oscillation of said VCO.

* * * * *